United States Patent [19]

Peng et al.

[11] 4,030,769
[45] June 21, 1977

[54] STRUCTURES FOR FOLDING BABY-CARRIAGES, CHAIRS, AND THE LIKE

[76] Inventors: Luke Shih-Cheng Peng, No. 30-1 Lane, 350, Wu Hsing Street; Herbert Chia-Chen Yu, No. 2-4, Alley 12, Lane 118, Jen Ai Road, Sec. 3, both of Taipei, China /Taiwan

[22] Filed: May 24, 1976
[21] Appl. No.: 689,598
[52] U.S. Cl. ............................... 280/42; 280/650; 297/45
[51] Int. Cl.² ................................... B62B 11/00
[58] Field of Search ............ 280/42, 642, 644, 647, 280/650; 297/45

[56] References Cited
UNITED STATES PATENTS

| | | | |
|---|---|---|---|
| 3,390,893 | 7/1968 | MacLaren | 280/644 X |
| 3,917,302 | 11/1975 | Gebhard | 280/644 |
| 3,945,660 | 3/1976 | Zalewski | 280/42 |

*Primary Examiner*—Joseph F. Peters, Jr.
*Assistant Examiner*—Michael J. Forman
*Attorney, Agent, or Firm*—Burns, Doane, Swecker & Mathis

[57] ABSTRACT

A carriage, chair, or similar structure is described having two cross frames which are interpivotally connected by means of a two axis pivot joint and which are held in their unfolded position at a fixed angle with respect to each other by rigid brace members pivotally connected to the sides of the frames and characterized in that the said brace members each comprise three sections, the middle sections provide horizontal rests for arms. The carriage, chair, or similar structure also incorporates a two piece toggle bar, and three piece knuckle strut disposed in front to serve both as a support member for the carriage structure and as a rest or support member for the object, e.g., a passenger, to be placed in the structure.

5 Claims, 13 Drawing Figures

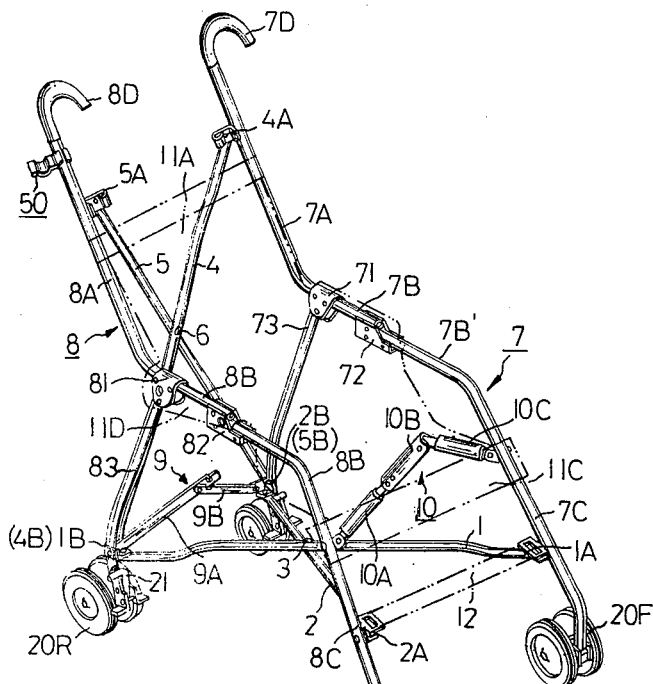
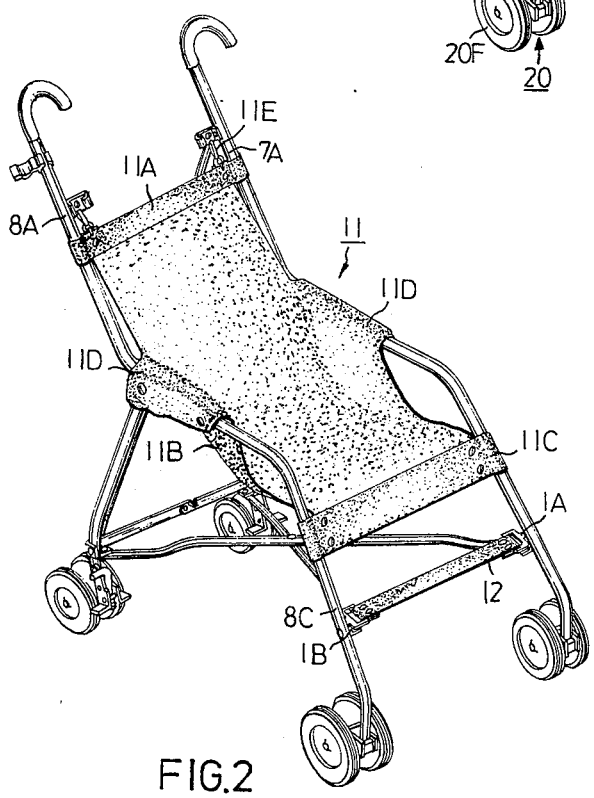
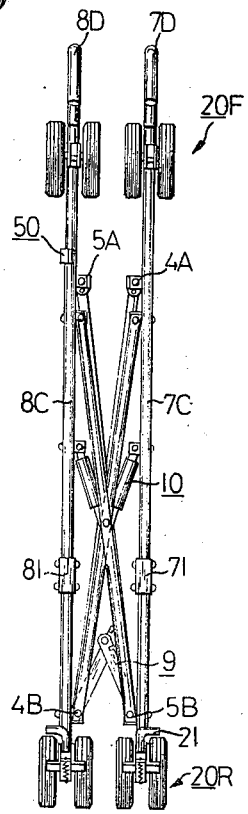
FIG.1
FIG.2
FIG.7

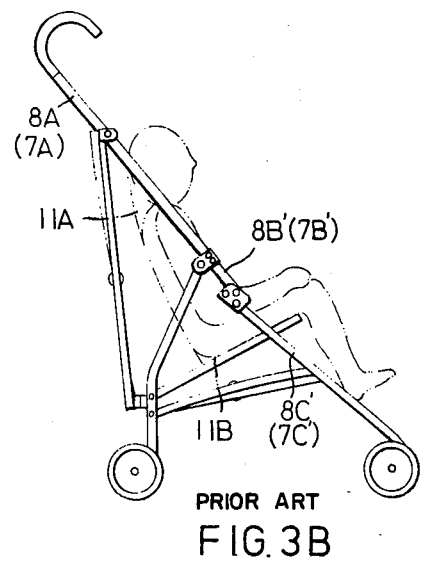
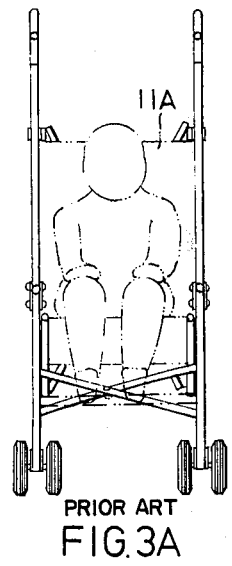
PRIOR ART
FIG. 3B
PRIOR ART
FIG. 3A
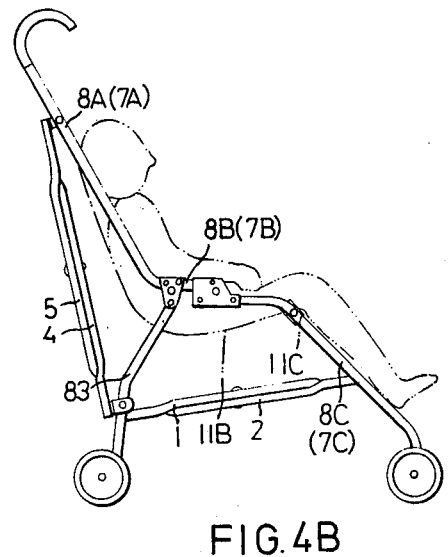
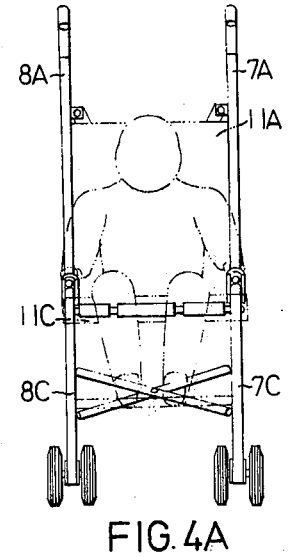
FIG. 4B
FIG. 4A

STRUCTURES FOR FOLDING BABY-CARRIAGES, CHAIRS, AND THE LIKE

FIELD OF INVENTION

The present invention relates generally to folding carriages, folding chairs and similar structures, and more particularly to a folding structure of this kind which is collapsible so as to occupy only a relatively small or diminished cross-sectional area, as with, e.g., a folded umbrella.

The present invention comprises two cross-frames formed by intersecting interpivoted rigid elements, which frames are articulately inter-connected at two corresponding corners thereof so that when extended, the frames lie substantially in planes at a right angle one to the other and when collapsed lie substantially parallel. Disposed at two sides of the extended frames are brace elements each of which comprise three sections, middle sections thereof provide horizontal rests for arms. A two piece collapsible toggle-bar means is disposed to connect the two frames in the rear. A three piece knuckle strut is provided between the two side elements in the front of the carriage to serve as both a support member for the carriage structure and as a rest or support member for the object, e.g., a passenger to be placed in the structure.

BACKGROUND OF INVENTION

The prior art comprises many folding carriage structures most of which are collapsible. See, e.g., U.S. Pat. No. 3,390,893 by Maclaren et al. The difficulty with the prior art devices is that the two side brace elements surround and confine on both sides a passenger in the seat resulting in a very uncomfortable and unnatural seated position. Further, only a toggle bar at the rear of the seat is provided for carriage support. The legs, and in particular, the knee joints of the passenger are forced to rest against the lower edge of a bucket-like seat, which is formed of a material such as woven plastic. This is also a disadvantage resulting in an even more confined and unnatural seated position.

SUMMARY OF THE INVENTION

Therefore the main object of the present invention is to provide a folding structure for a carriage, chair, or the like, which provides both a more spacious seat and also arm rests for the passenger, resulting in a more comfortable and natural seated position.

Another object of the present invention is to provide a folding structure with an articulated support member attached thereto in the front edge of the seat to give both support to the carriage and a rest for the knee of the passenger.

Still another object of the present invention is to provide a folding carriage structure comprising a clip at a location near the handle to hold the structure together when folded.

A further object of the present invention is to provide a folding carriage structure comprising a fabric seat that can be attached to said structure on its top by hangers and snapped to said structure at two sides and at the lower edge so as to be easily detachable.

Other objects and features of the present invention will become clear from the following description taken in conjunction with the annexed drawings.

BRIEF DESCRIPTION OF DRAWINGS

FIG. 1 is a perspective view of the structure of a preferred embodiment of the present invention in an unfolded or open position;

FIG. 2 is a perspective view of the same embodiment with seat attached;

FIG. 3(A) and (B) and FIG. 4(A) and (B) are side and front views of a comparison between carriages, and in particular, between the brace elements of the prior art carriage, as embodied in FIG. 3(A) and (B), and the carriage of the present invention showing the more spacious seat with arm rest of the novel design;

FIG. 7 is a front elevation of the structure in a folded position;

DETAILED DESCRIPTION OF EMBODIMENT

Figure 5:
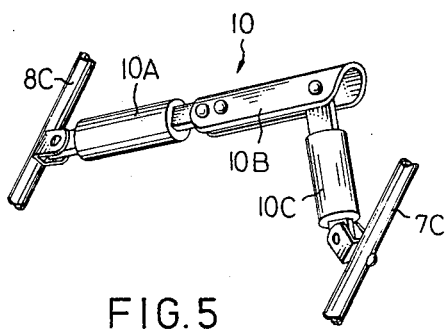
FIG. 5 depicts the detail of the three-piece knuckle strut member in perspective.

Referring to FIG. 1, the bottom cross-frame of the carriage comprises two tubes 1 and 2, pivoted at their intersection 3, with front corners 1A, 2A and rear corners 1B, 2B, respectively. The rear cross frame comprises two tubes 4 and 5, pivoted at their intersection 6. Its upper corners are 4A, 5A and bottom corners 4B, 5B, respectively. The bottom cross frame formed by tubes 1 and 2 lies in an approximately horizontal plane when unfolded. The tubes 4 and 5, constituting the rear cross-frame, occupy a plane which is inclined by a small angle from the vertical. Near the corners 4B, 5B, the ends of tubes 1, 2, 4 and 5 are joined together articulately (e.g., joined so as to allow relative motion between the elements by, e.g., hinged joints). It follows that if either cross-frame is collapsed about its intersection 3 or 6, the other must collapse likewise.

From near the corners 1A, 2A respectively to the corners 4A, 5A and extending upward therefrom, there are located brace assemblies 7 and 8, each comprising three-piece members. Each three-piece member comprises an upper section 7A (8A), a horizontal section 7B—7B' (8B—8B') and a lower section 7C (8C). Members 7A, 8A are knuckle-jointed (i.e., hinged-jointed with an eye on one member which fits between two flat projections with eyes on the other member and is retained by a round pin) and articulated near the corners at 4A and 5A to the back cross-frame. Member 7B (8B) actually is a lower horizontal extension of 7A (8A) while member 7B' (8B') is an upper horizontal extension of 7C (8C) which is articulately joined to front corner 1A (2A) of the bottom cross-frame. Members 7B—7B' (8B—8B') are knuckle-jointed by member 72 (82). When unfolded, both upper sections 7A and 8A and lower sections 7C and 8C are inclined toward the carriage rear and parallel to each other. The horizontal portions thereof provide the arm rests for the passenger. The lower ends of members 7C and 8C provide mounts for a front wheel assembly 20 comprising double-wheel pairs 20F—20F. On the rear portion of member 7B (8B) near 7A (8A), a triangular knuckle member 71 (81) is provided to pivot a rear leg 73 (83), which leg extends downward to meet and join corner 2B (1B). The end of the leg serves as a mount for rear wheel pair 20R—20R. Brake means 21 are disposed on the rear wheel pairs, details of which shall be discussed further with respect to FIGS. 8 and 9.

Between the corners 1B (4B), 2B (5B) is a toggle bar 9. This bar comprises two rigid sections, e.g., tubes or bars, namely members 9A, 9B, connected with a knuckle joint. The said toggle bar is arranged to lock just at or over a dead center and serves to define the lateral dimension of the structure.

Connected between brace member sections 7C and 8C, at a position corresponding to the knee joint of the passenger is a strut 10 which comprises three sections 10A, 10B and 10C. Sections 10A and 10C are short tubes covered with a resilient material, e.g., foam rubber, to provide padding for the knee or leg support. The sections are joined with a knuckle member 10B. The outer ends of sections 10A and 10C are articulately connected to brace members 7C and 8C. The length of the strut 10 is equal to that of the toggle bar 9 thereby defining the lateral dimension of the structure. Details of the said strut 10 are shown in FIG. 5. Toggle bar 9, strut 10 and knuckle member 72 (82) all constitute releasable support means.

FIG. 2 depicts the mounting of the seat fabric 11 onto the carriage structure. The fabric is preferably made of woven plastic. At upper edge 11A, a lateral strap is provided with ends capable of being wrapped over brace members 7A, 8A and held in position with snaps. On the top corners of the said edge 11A, hangers 11E are provided to hang the fabric on structure corners 4A, 5A. Side wings 11D of the seat fabric are wrapped over the arm rest portion of the structure and positioned there with snaps. The lower edge 11C of the fabric is also provided with lateral straps which are capable of being wrapped over brace members 7C and 8C and snapped into position. The seat 11B takes shape commonly known in the art and hereinafter referred to as a bucket seat. It differs, however, from conventional seats in that the strut 10 is provided for support of both the carriage and knee of the passenger. Both the arm rests and the knee rest are unique features of the present invention. A seat is hereby provided without confining the passenger in an uncomfortable and unnatural position between the two side brace elements. The passenger can comfortably rest his arms on the arm rest and place his body comfortably in the seat. A foot rest 12, formed by a band of woven plastic or the like, is attached to corners 1A and 1B in any conventional way.

In the comparison shown in FIGS. 3 and 4, the above said features of the present invention are clearly shown. In a seat of the present invention, (FIGS. 4A and B) the passenger is shown seated comfortably with arms placed on the arm rest while in the conventional structure (FIGS. 3A and B), the passenger is squeezed in a narrow space confined by the side brace elements 7B' (8B') and 7C' (8C'), with no provision for arm rests.

Figure 6:
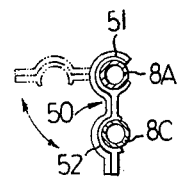
FIG. 6 is a top view of the carriage handles in the folded or closed position showing the holding clip.

In FIG. 6, a holding clip assembly 50 of plastic material is furnished with one tubular end 51 partially surrounding the member 7A (8A), and another end 52 of elastic material, the clip assembly being rotatable around member 7A (8A), to clip onto the member 7C (8C) when the carriage assembly is folded. The uppermost end of members 7A, 8A are curved and have appropriate grips, forming handles 7D, 8D, which provides a convenient carrying handle when the structure is folded as in FIG. 7.

To fold the structure from the condition of FIG. 1 to that of FIG. 7, the user releases the toggle bar 9 and strut 10 and urges the handles 7D, 8D together. This collapses the cross-frames. The user may also assist folding by directly raising the forward end of the structure or pressing down the handles toward the ground, until the folded condition in FIG. 7 is reached.

Figure 8A:
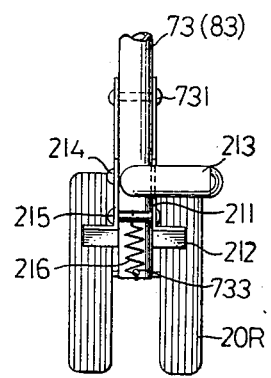
FIG. 8 depicts the details of the brake provided for rear wheels, FIG. 8(A) being a front elevation and FIG. 8(B) a perspective view, both showing the brake in release.
Figure 8B:
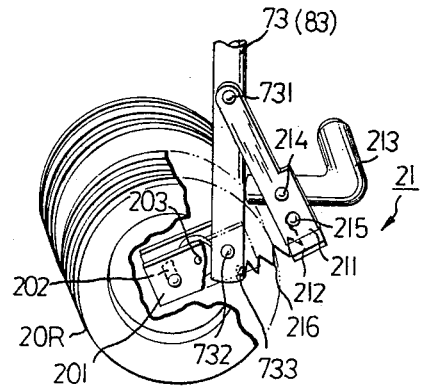
Figure 9A:
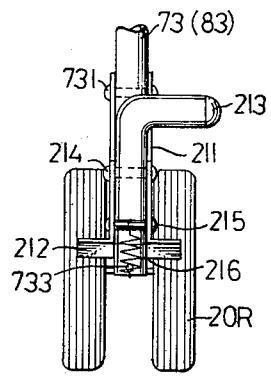
FIG. 9(A) and (B) corresponding to FIG. 8(A) and (B), showing the brake in an active or braking position.
Figure 9B:
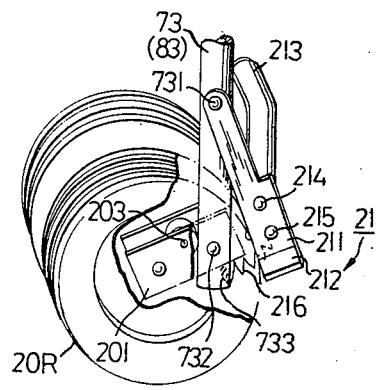

In FIGS. 8 and 9, details of brake mechanism 21 are shown. FIG. 8 depicts the brake being in release position while FIG. 9. depicts the brake being in active or braking position.

The pair of rear wheels 20R—20R are mounted on axle 202, the ends of which are born on one end of a pair of bearing plates 201—201. A buffer block 203 is riveted to the middle section of the pair of bearing plates 201—201, block 203 being of resilient material such as rubber and serving as a shock absorber. One end of the pair of the bearing plates is pivotally jointed with pivot pin 732 to the lower end of the rear legs 73 (83). This construction is also provided for the front wheel pairs. A pair of L-shaped braking members have top portions pivoted with pivot pin 731 to the rear leg 73 (83). The middle portions are pivotally jointed with pivot pin 214 to an elbow like actuating handle 213. The movement of the said handle can be controlled by the user's foot. When the handle is kicked down, the short arms 212—212 of the pair of L-shaped brake members will release from engagement with the tires of wheel pairs 20R—20R and the carriage is free to move. When the handle is kicked up, the short arms 212—212 will engage with the tires of rear wheel pairs 20R—20R so that the carriage is under the braking condition. An extension spring 216 is anchored between a pin 215 which connects the lower ends of the two long arms 211—211 of the L-shaped brake members, and the lower end of rear leg 73 (83) at opening 733. The handle 213 is operated against the force of the said spring 216.

The above embodiment is given only for illustration purposes and not by way of limitation, and various modifications will become evident to those skilled in the art which will fall within the scope of the attached claims.

We claim:
1. A collapsible carriage structure comprising:
a collapsible bottom cross-frame formed by a first pair of intersecting interpivoted rigid elements;
a collapsible back cross-frame formed by a second pair of intersecting interpivoted rigid elements, said bottom and back cross-frames articulately interconnected at a pair of respective ends;
two collapsible side brace assemblies each comprising an upper, lower and middle section, said upper sections including handle means,
said upper sections articulately interconnected to the respective upper ends of the back cross-frame, and inclined backward and parallel to each other when unfolded,
said lower sections articulately interconnected to the respective front ends of the bottom cross-frame, and inclined backward and parallel to each other when unfolded,
said middle section forming a generally horizontal arm rest comprising:
a horizontally disposed lower extension of said upper section;

a horizontally disposed upper extension of said lower section; and a knuckle member joining said extensions together to form a collapsible joint;

two rigid rear support legs each connected on one end to a respective one of said lower extensions of said upper sections by means of a triangular knuckle member and each articulately connected to the respective rear end of said bottom cross-frame;

means for releasably locking said structure in the open position; and, pairs of double wheel sets disposed on the lower end of said lower sections of said side assemblies and on the lower end of said rear legs;

said cross-frames and side brace assemblies capable of being cooperatively collapsed so as to cause the carriage structure to occupy a diminished cross-sectional area.

2. The structure according to claim 1 wherein said releasable locking means includes:

a toggle bar comprising
 a first bar pivotably connected to one rear end of said bottom cross-frame,
 a second bar pivotably connected to the other rear end of said bottom cross-frame, and
 a locking coupling joining said first and second bar together;

a three part strut disposed between said lower sections of side brace assemblies operative to provide support behind the passenger's knees comprising:
 a first tube articulately connected to one brace;
 a second tube articulately connected to the other brace; and,
 a knuckle member fixed to said first tube and pivotably connected to said second tube;

resilient material covering said first and second tubes to provide a cushion for behind the passengers knees;

said toggle bar and said strut defining the lateral dimension of the structure.

3. The structure of claim 1 further including a foldable bucket seat disposed within said structure for holding a passenger therein and including;

an upper edge strap having mating snaps on the ends thereof wrapped over said upper sections of said side braces and secured thereabout by means of said snaps;

two side wings having mating snaps on the ends thereof wrapped over said arm rest portions of said middle sections of said side braces and secured thereabout by means of said snaps;

a lower edge strap having mating snaps on the ends thereof wrapped over said lower sections of said side braces and secured thereabout by means of said snaps; and, hangers affixed to the top corners of said seat for hanging said seat from the upper ends of said back cross-frame.

4. The structure of claim 1, further including a plastic holding clip affixed to one upper section of said side brace and adapted to rotatably clip onto said other upper section of said side brace when said structure is folded for holding said folded structure closed.

5. The structure of claim 1 further including a rear wheel brake mechanism comprising:

a pair of L-shaped brake members pivotably connected at the tops of their longer arms to a rear leg of said structure above said wheels;

a pin joining the lower ends of said longer arms together in spaced apart relationship;

a tension spring connected between said pin and the lower end of said leg for biasing the shorter arms of said L-shaped brake members against said wheels;

an actuating elbow pivotably connected to both of said L-shaped members at approximately the middle portions thereof and operable with the users foot from a first position;

wherein a portion of said elbow engages said rear leg to hold said short arms of said pair of spring biased L-shaped brake members away from said wheels so that the carriage is free to move;

to a second position where said elbow disengages said rear leg and permits said short arms to engage said wheels under the action of said spring to provide a brake for the carriage.

* * * * *